(12) United States Patent
Lotz et al.

(10) Patent No.: US 10,103,603 B2
(45) Date of Patent: Oct. 16, 2018

(54) ELECTRIC MOTOR WITH COMBINED LIQUID AND AIR COOLING

(71) Applicant: MOTEURS LEROY-SOMER, Angouleme (FR)

(72) Inventors: Hubert Lotz, Belfort (FR); Mickael Douvry, Beaucourt (FR); Thierry Pera, Belfort (FR); Philippe Ciciliani, Valentigney (FR)

(73) Assignee: MOTEURS LEROY-SOMER, Angouleme (FR)

( * ) Notice: Subject to any disclaimer, the term of this patent is extended or adjusted under 35 U.S.C. 154(b) by 232 days.

(21) Appl. No.: 15/125,414

(22) PCT Filed: Mar. 6, 2015

(86) PCT No.: PCT/IB2015/051645
§ 371 (c)(1),
(2) Date: Sep. 12, 2016

(87) PCT Pub. No.: WO2015/136421
PCT Pub. Date: Sep. 17, 2015

(65) Prior Publication Data
US 2017/0077787 A1 Mar. 16, 2017

(30) Foreign Application Priority Data
Mar. 12, 2014 (FR) ..................... 14 52060

(51) Int. Cl.
*H02K 9/19* (2006.01)
*H02K 9/197* (2006.01)
*F16K 24/04* (2006.01)
*H02K 5/10* (2006.01)
*H02K 9/06* (2006.01)

(52) U.S. Cl.
CPC ............. *H02K 9/197* (2013.01); *F16K 24/04* (2013.01); *H02K 5/10* (2013.01); *H02K 9/06* (2013.01); *H02K 9/19* (2013.01); *H02K 2205/09* (2013.01)

(58) Field of Classification Search
CPC .... H02K 5/10; H02K 9/06; H02K 9/19–9/20; H02K 2205/09
See application file for complete search history.

(56) References Cited

FOREIGN PATENT DOCUMENTS

| DE | 10349543 B3 | 11/2004 |
|---|---|---|
| DE | 202005001931 U1 | 4/2005 |
| JP | H09-191597 A | 7/1997 |
| SU | 597048 A1 | 3/1978 |

OTHER PUBLICATIONS

Oct. 30, 2015 International Search Report issued in International Patent Application No. PCT/IB2015/051645.
Sep. 13, 2016 International Preliminary Report on Patentability issued in International Application No. PCT/IB2015/051645.
Jan. 22, 2015 Preliminary Search Report issued in French Patent Application No. 1452060.

*Primary Examiner* — Ramon M Barrera
(74) *Attorney, Agent, or Firm* — Oliff PLC

(57) ABSTRACT

Electric motor includes a housing provided with an opening equipped with a membrane forming a barrier to liquid water between the inside and the outside of the housing but permeable to water vapor, the stator being liquid cooled and the motor having an internal fan to generate a forced circulation of air inside the motor, the membrane being situated in a region in which the forced circulation of air exposes it on the inside to a pressure higher than atmospheric pressure.

11 Claims, 2 Drawing Sheets

ELECTRIC MOTOR WITH COMBINED LIQUID AND AIR COOLING

The present invention relates to electric motors and more particularly to liquid-cooled, notably water-cooled, electric motors.

Because of the circulation of the water, these motors are subjected internally to relatively high temperature differences. These conditions lead to the formation of condensate of which there may be a very large amount. This condensate is liable to damage the motor and it is therefore of critical importance to remove it. One usual solution is to perform regular draining operations, using one or more drainage holes situated in the bottom position of the motor housing. This solution is not entire satisfactory because it involves regular maintenance leading to high costs and is not always possible in an operational situation.

Publications DE 202005001931 and DE 10349543 describe motors equipped with a purge plug comprising a membrane that is impermeable to liquids and permeable to gases. The motors described in these publications are not cooled by a circulation of water and are not subjected to temperature differences that are as high as liquid-cooled machines. As a result, the problem regarding the removal of the condensate does not arise in quite the same way.

The invention seeks to further improve electric motors that are cooled by a circulation of liquid and achieves this using an electric motor comprising a housing provided with an opening equipped with a membrane forming a barrier to liquid water between the inside and the outside of the said housing but permeable to water vapour, which is characterized in that the stator is liquid cooled and in that the motor furthermore comprises an internal fan to generate a forced circulation of air, the membrane being situated in a region in which the forced circulation of air exposes it on the inside to a pressure higher than atmospheric pressure.

The introduction of a forced circulation of air, in addition to the circulation of liquid, makes it possible to encourage the removal of moisture by making exchanges of gases with the outside easier because of the sitting of the membrane at a point where the air pressure inside the motor is higher than atmospheric pressure.

The fan is preferably a radial air flow fan; that may allow the membrane to be exposed to a stream of air emitted by the fan at higher speed; the turbulence created may encourage exchanges of gas and the removal of water vapour. The fan generates a stream of air passing preferably through the air gap and through the rotor and the stator. The circulation of air through the stator allows the latter to be cooled by exchange of heat with the cooling liquid which likewise passes over the stator.

The membrane is preferably situated in the half of the motor that is closest to the fan. For example, in the case of a radial-flow fan in particular, the membrane may occupy an axial position, on the axis of rotation, that at least partially intersects that of the fan.

The membrane may comprise any material that has the required semi-permeability, notably a florinated porous material, preferably comprising PTFE. The membrane may be fixed permanently to the housing. However, it is preferably carried by a plug fixed removably to the housing. This plug may be configured to be screwed into the aforementioned opening in the housing. It may comprise a body of annular shape, possibly made of metal.

The level of sealing of the membrane to liquid water preferably corresponds to an ingress protection index of IP55 or better.

The opening may be arranged in the upper part of the housing or, as an alternative, in the lower part of the housing, so as to allow the latter to be drained. For preference, the opening is arranged in the upper part so as to prevent condensate from forming a barrier to the diffusion of vapour through the membrane.

Sealing between the membrane and the body of the plug may be afforded by a seal, by mechanical tightness or by any other conventional sealing means.

The ducts for the circulation of air to the stator may be radially further out than the ducts used for circulating the cooling liquid.

The air and the cooling liquid preferably circulate countercurrentwise in the stator, inside the housing, in the lower part of the motor, and co-currentwise in the upper part, or vice versa.

The air circulates in one direction in the air gap and the rotor and in the opposite direction in the stator.

The housing may have a double wall in the region of the stator, one wall for containing the circulation of the liquid and the other for the circulation of the air.

A further subject of the invention is a method for cooling an electric motor according to the invention, as defined hereinabove, and comprising a housing, in which method a forced circulation of air inside the motor and a circulation of liquid inside the stator are generated, the electric motor comprising a membrane that is impermeable to liquid water but permeable to water vapour, the membrane being situated in a part of the housing where the air pressure on the inside of the housing is higher than atmospheric pressure.

The invention may be better understood from reading the detailed description which will follow, of one nonlimiting exemplary embodiment thereof and from studying the attached drawing in which:

FIG. 1 depicts a motor 1 comprising a housing 10 constituting a relatively closed and sealed chamber, preferably having a water ingress protection index of IP55.

Figure 1:
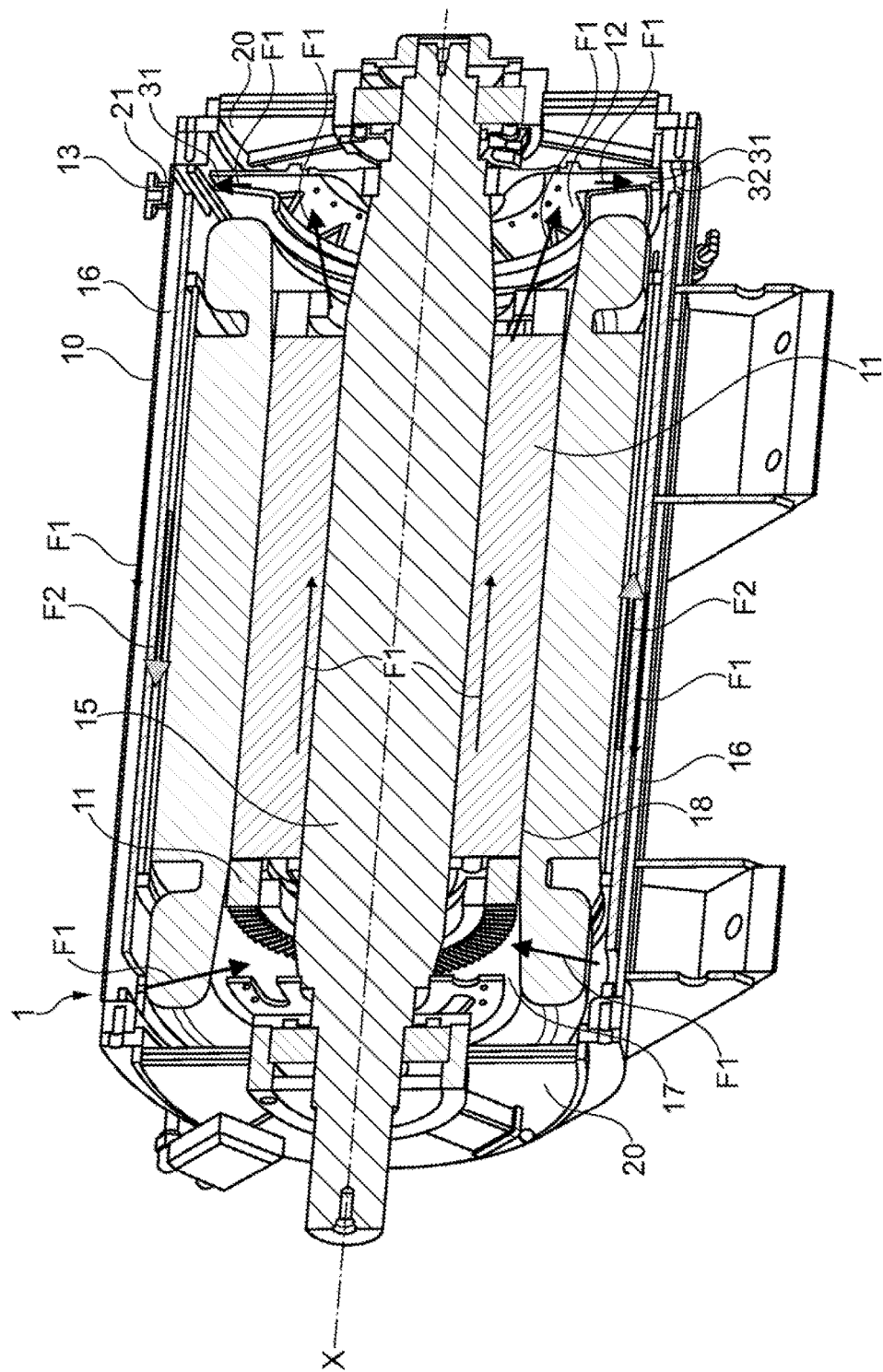
FIG. 1 is a schematic and partial depiction in longitudinal section of a motor according to the invention.
Figure 2:
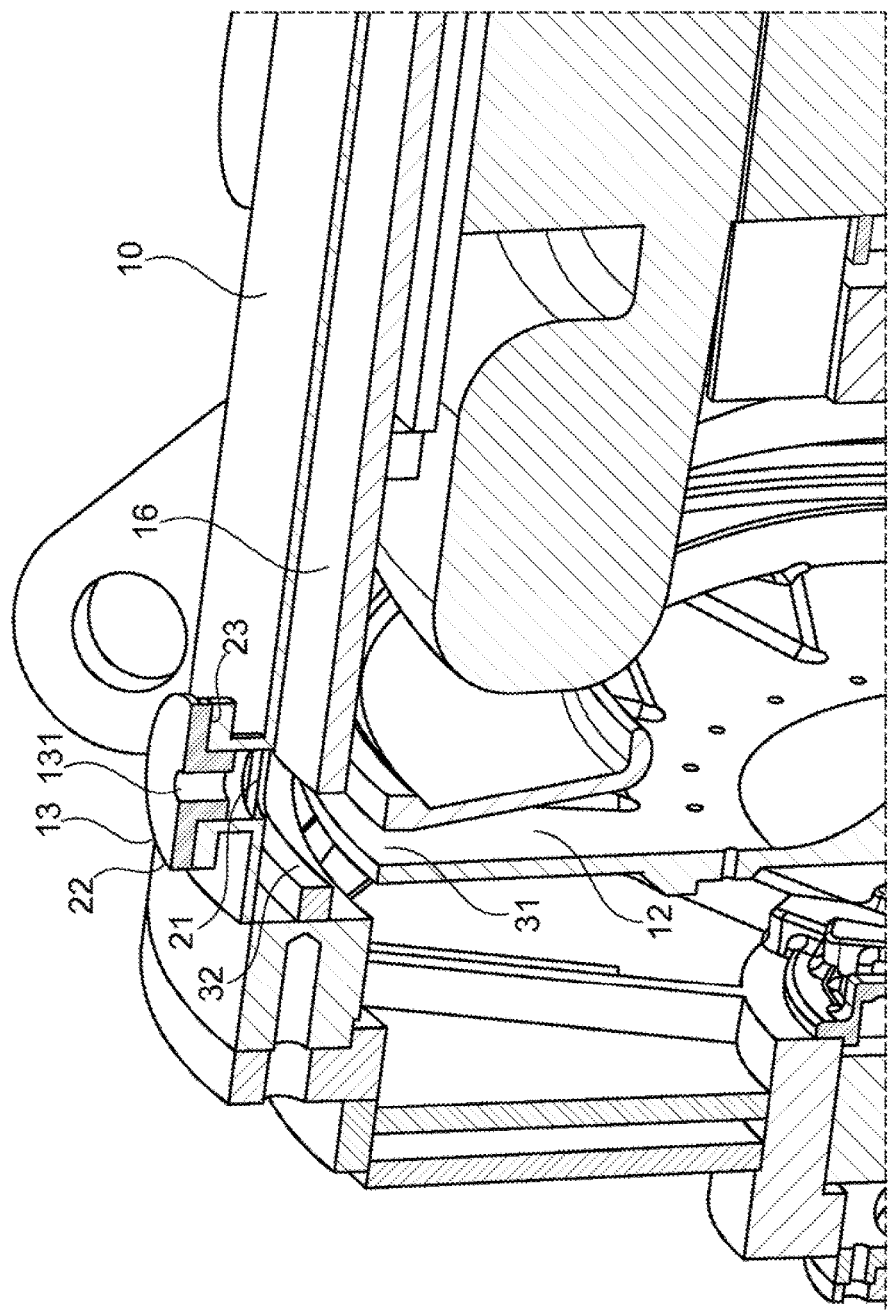
FIG. 2 depicts a detail of the motor of FIG. 1.

The housing is of elongate shape along an axis X, being closed at both ends by endplates 20 which define a front end and a rear end.

The housing 10 contains the rotor 11, which drives the rotation of a fan 12, arranged at the rear end of the motor.

The rotor is conventionally borne by a shaft 15 of axis X, and guided by rolling bearings supported by the endplates 20, in the conventional way.

The fan 12 generates a forced stream of air F1 which circulates along ducts 16 of the stator, along the stator, from the rear forwards.

The air leaving the ducts 16 emerges at the front of the rotor into a space 17. It then circulates into the air gap 18 and through the rotor 11, then back to the fan 12.

The latter is preferably a radial-flow fan, comprising an air inlet around the shaft 15. Internal vanes generate a radial stream of air which leaves the fan 12 via an air outlet 31 arranged at the periphery. The air is ejected towards inlet passages 32 entering the ducts 16.

The stator is cooled by a circulation of liquid F2, for example water, which comes from an external source, circulates through ducts inside the stator, and exits to return to the outside.

In the case of motors used in marine applications, the cooling liquid is, for example, seawater. The circulation of liquid allows the cooling of the stator.

The stream of air F1 is cooled by circulating in the stator.

In order to prevent the formation and/or build-up of condensate, a plug 13 is provided in an opening 21 of the housing 10. The plug 13 is, for example, screwed into this opening 21. The plug 13 in the example considered comprises a body 22 of annular shape, which may or may not be made of metal, supporting a semi-permeable membrane 131. The latter is permeable to water vapour but impermeable to liquid water. The membrane is, for example, made of PTFE of the Goretex® type. The plug 13 allows water vapour contained inside the motor to escape through the membrane.

According to the invention, in order to encourage the circulation of water vapour-laden air through the membrane 131, the plug 13 is sited in a zone where the air pressure is higher than atmospheric pressure, preferably more or less facing the air outlet 31 of the fan 12, as illustrated.

In the example considered, the plug 13 is thus positioned at the rear end of the motor more or less facing the air inlet passages 32 into the ducts 16. The plug 13 may be sited in the upper part of the motor, as illustrated or, in an alternative form that has not been depicted, in the lower part, so as also to have a purge function if necessary.

The membrane 131 may be fixed to the body 22 by any suitable means. An O-ring seal 23 may be carried by the plug 13 and press against the housing when the plug 13 is in place.

The invention is not restricted to the example that has just been described and may be applied to electric motors in applications other than marine applications. The cooling liquid may circulate in a closed loop between the motor and an installation for cooling this liquid or, as an alternative, may circulate in open circuit, the water injected into the motor being discharged into the environment which may, for example, be the case with seawater used for cooling.

The fan 12 may be driven not by the shaft of the rotor but by a specific drive machine.

The expression «comprising» is to be understood as being synonymous with «comprising at least» unless specified to the contrary.

The invention claimed is:

1. An electric motor comprising a housing provided with an opening equipped with a membrane forming a barrier to liquid water between an inside and an outside of the said housing but permeable to water vapor, the stator being liquid cooled and the motor comprising an internal fan to generate a forced circulation of air inside the motor, the membrane being situated in a region in which the forced circulation of air exposes it on the inside to a pressure higher than atmospheric pressure.

2. The electric motor according to claim 1, the membrane being situated in an half of the motor that is closest to the fan.

3. The electric motor according to claim 1, the membrane comprising a fluorinated porous material.

4. The electric motor according to claim 3, the membrane comprising PTFE.

5. Electric The electric motor according to claim 1, the membrane being carried by a plug fixed removably to the housing.

6. The electric motor according to the claim 5, the plug being configured to be screwed into the opening.

7. The electric motor according to claim 1, the opening being arranged in the upper part of the housing.

8. The electric motor according to claim 1, the fan being a radial-flow fan.

9. The electric motor according to claim 1, the membrane occupying, on an axis of rotation, an axial position that at least partially intersects that of the fan.

10. The electric motor according to claim 1, the air circulating along ducts for circulation to the stator which are radially further out than those used for circulating the cooling liquid.

11. A method for cooling an electric motor comprising a housing, in which method a forced circulation of air and a circulation of liquid are generated, the electric motor comprising a membrane that is impermeable to liquid water but permeable to water vapor, the membrane being situated in a part of the housing where the air pressure on the inside of the motor is higher than atmospheric pressure.

* * * * *